United States Patent
Azuma et al.

(10) Patent No.: US 6,297,942 B1
(45) Date of Patent: Oct. 2, 2001

(54) METAL TERMINAL AND ELECTRONIC COMPONENT INCLUDING SAME

(75) Inventors: Takahiro Azuma, Fukui; Hidetoshi Yamamoto, Sendai; Kunio Okumura, Takefu; Tadahiro Nakagawa, Fukui, all of (JP)

(73) Assignee: Morata Manufacturing Co., LTD, Kyoto (JP)

( * ) Notice: Subject to any disclaimer, the term of this patent is extended or adjusted under 35 U.S.C. 154(b) by 0 days.

(21) Appl. No.: 09/143,728

(22) Filed: Aug. 31, 1998

(30) Foreign Application Priority Data

Sep. 5, 1997 (JP) .................................................. 9-240846

(51) Int. Cl.$^7$ ............................. H01G 4/236; H01G 4/35
(52) U.S. Cl. ........................................... 361/307; 361/302
(58) Field of Search ................................. 361/302, 306.1, 361/306.2, 306.3, 307, 308.1, 308.3; 333/183; 439/263, 825; 174/152 GM

(56) References Cited

U.S. PATENT DOCUMENTS

| | | | |
|---|---|---|---|
| 3,545,080 | * 12/1970 | Evans ...................................... | 24/618 |
| 3,634,819 | * 1/1972 | Evans ...................................... | 439/82 |
| 3,743,979 | * 7/1973 | Schor ...................................... | 439/825 |
| 3,853,377 | * 12/1974 | Shlesinger, Jr. ....................... | 333/182 |
| 4,083,022 | * 4/1978 | Nijman .................................. | 333/185 |
| 4,801,904 | * 1/1989 | Sakamoto et al. .................... | 333/183 |
| 4,908,942 | * 3/1990 | Long et al. ............................ | 439/82 |
| 5,103,292 | * 4/1992 | Mahulikar ............................ | 257/699 |
| 5,287,076 | * 2/1994 | Johnescu et al. ..................... | 331/25 |
| 5,546,058 | * 8/1996 | Azuma et al. ........................ | 333/183 |

\* cited by examiner

*Primary Examiner*—Dean A. Reichard
*Assistant Examiner*—Eric W. Thomas
(74) *Attorney, Agent, or Firm*—Keating & Bennett, LLP

(57) ABSTRACT

A metal terminal includes a central portion having a cross section with a relatively large internal diameter and an approximately circular shape and cylindrical portions having a relatively a smaller diameter are extended from both sides of the central portion. The approximately circular shape portion is inserted into a through hole of a through hole type capacitor and disposed in contact with and elastically pressing against the inner wall of the through hole.

10 Claims, 4 Drawing Sheets

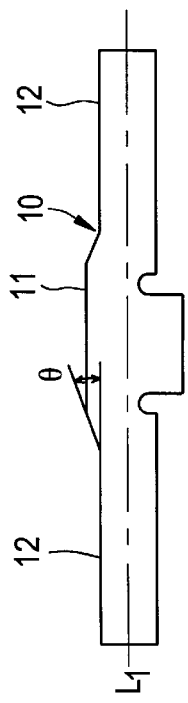
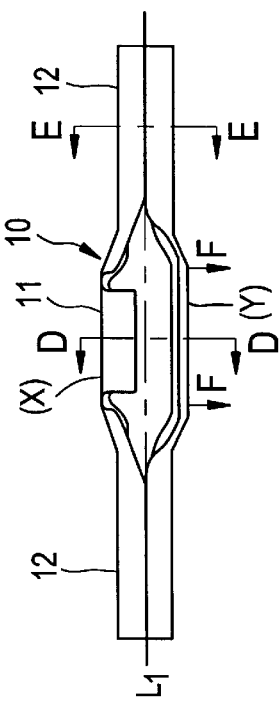
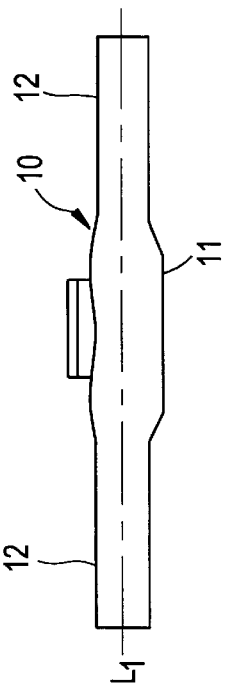
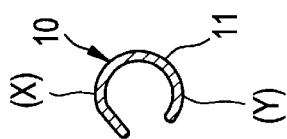

METAL TERMINAL AND ELECTRONIC COMPONENT INCLUDING SAME

BACKGROUND OF THE INVENTION

1. Field of the Invention

The present invention relates to a metal terminal to be inserted into a through hole of a through-hole type electronic element such as a through-hole type capacitor, and relates to an electronic component such as a through-hole type LC filter having such a metal terminal.

2. Description of the Related Art

In the past, a metal terminal 5 which is arranged in a through-hole type capacitor 1 in a through-hole type LC filter in FIG. 4 has a structure as shown in FIGS. 5A and 5B. The through-hole type LC filter shown in FIG. 4 is composed of a through-hole type capacitor 1, ferrite beads 2 arranged on both sides of the capacitor 1, conductive metal caps 3 attached to the end portion of each of the ferrite beads 2 and a metal terminal 5 inserted into the central portion of the capacitor 1, the beads 2 and the caps 3.

The metal terminal 5 is made by forming a metal plate 5' having an unfolded shape shown in FIG. 5A into a nearly cylindrical shape shown in FIG. 5B and such that the terminal 5 has at its central portion a tongue-like part 6 protruding in an expanded condition. The metal terminal 5 secures the capacitor 1 in the through-hole type LC filter and is electrically connected to an internal electrode of the capacitor 5 in such a way that the tongue-like part 6 is inserted into the through hole of the capacitor 1 and is arranged to elastically press against the inner wall of the through hole.

However, the metal terminal 5 is relatively easily deformed if it is relatively thin, and when the terminal 5 is pushed into the through hole of the capacitor 1, the centerline $L_1$ of the metal terminal 5 is displaced with respect to the centerline $L_2$ of the capacitor 1 such that the centerline $L_2$ is tilted with respect to the centerline $L_1$. This condition causes the capacitor to be inclined. Also, the tongue-like part 6 may also be deformed in the axial direction and displaced from the centerline $L_3$ of the length direction of the filter assembly. Such a deformed tongue-like part 6 causes large misalignments $d_1$ and $d_2$ between the outer surfaces of the capacitor 1 and the metal caps 3, as well as causing soldering defects when such a through-hole type LC filter is mounted on a printed circuit board or other substrate.

In the above-described LC filter, the component of inductance produced by the tongue-like part 6 is too large to ignore and the high-frequency characteristic is degraded. Furthermore, because the diameter D of the portion to be inserted into the through-hole of the ferrite beads 2 is difficult to reduce, there is a limit as to how much the thickness of the ferrite beads can be increased. This relationship prevents improvement in the elimination of noise by increasing inductance of the ferrite beads.

SUMMARY OF THE INVENTION

To overcome the problems described above, the preferred embodiments of the present invention provide a metal terminal which is constructed and arranged to maintain a position of a through-hole type electronic element accurately and reliably without being displaced and to improve a high-frequency characteristic and noise eliminating effect when the through-hole type electronic element with the metal terminal is incorporated in a noise filter.

Further, the preferred embodiments of the present invention provide an electronic component in which a through-hole type capacitor is maintained in a correct position and a high-frequency characteristic and a noise eliminating effect are excellent.

According to a preferred embodiment of the present invention providing the advantages described above, a metal terminal has a portion which is adapted to be inserted into a through hole of an electronic element and disposed into contact against an inner wall of the through hole, the portion being configured to have a cross-section which is approximately circular.

In the above-described metal terminal according to preferred embodiments of the present invention, the portion having a cross section of approximately circular shape elastically contacts and presses uniformly against the inner wall of the through hole of the electronic component. Consequently, the centerline of the electronic component is not displaced from the centerline of the metal terminal and the electronic component is maintained at a correct position with respect to the metal terminal. Also, there is no component of inductance created by the tongue-like part as in conventional components and the high-frequency characteristic of the electronic element is greatly improved.

Further, a metal terminal according to preferred embodiments of the present invention preferably has substantially cylindrical portions having a diameter that is smaller than a diameter of the approximately circular shape portion of the metal terminal and which are extended from both sides of the approximately circular shaped portion of the metal terminal. When this metal terminal is used and an electronic component is composed of a through-hole type capacitor mated with the approximately circular shaped portion of the metal terminal and ferrite beads are mated with the cylindrical portions having the smaller diameter of the metal terminal, the through-hole type capacitor is maintained in an accurate position and the high-frequency characteristic is greatly improved, but also the thickness of the beads can be greatly increased to thereby significantly increase the impedance.

Other features and advantages of the present invention will become apparent from the following description of the invention which refers to the accompanying drawings.

BRIEF DESCRIPTION OF THE DRAWINGS

FIG. 1A illustrates a plan view of a preferred embodiment of a metal terminal according to the present invention;

FIG. 1B illustrates a front view of a preferred embodiment of a metal terminal according to the present invention;

FIG. 1C illustrates a bottom plan view of a preferred embodiment of a metal terminal according to the present invention;

FIG. 1D illustrates a sectional view taken along line D—D of FIG. 1B;

FIG. 1E illustrates a sectional view taken along line E—E of FIG. 1B;

4 is a sectional view showing a conventional through-type LC filter; and

Figure 5A:
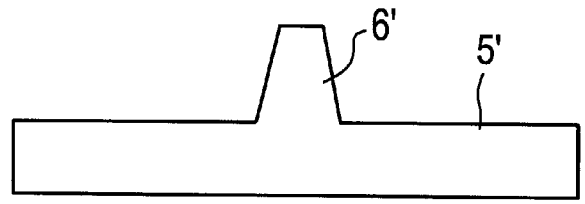
Figure 5B:
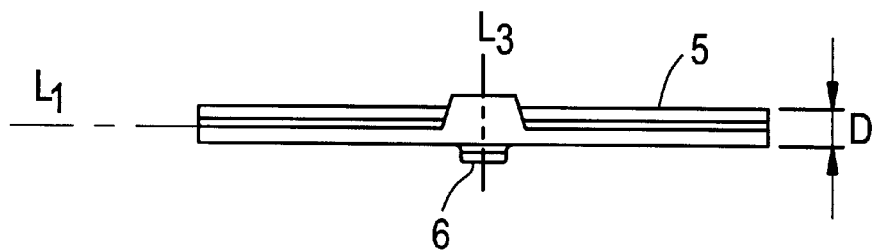
Figure 6C:
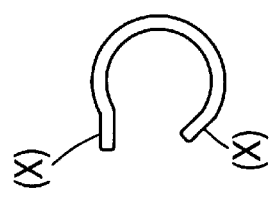
Figure 6A:
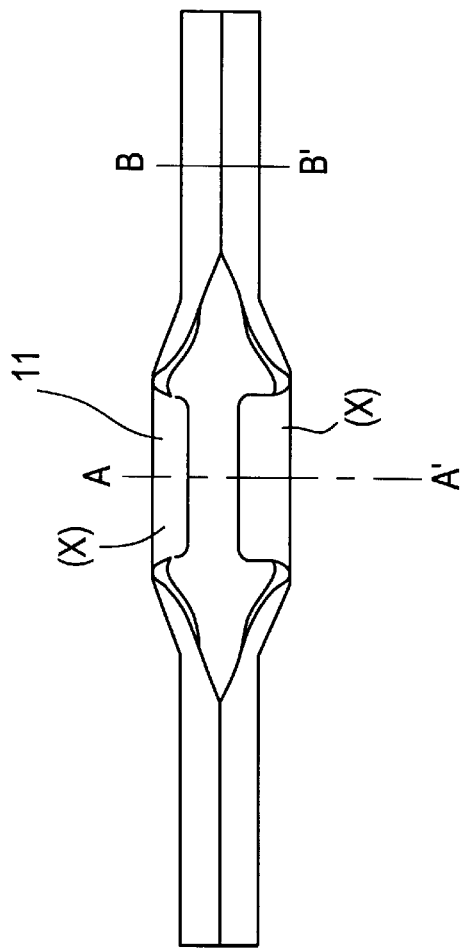
Figure 6B:
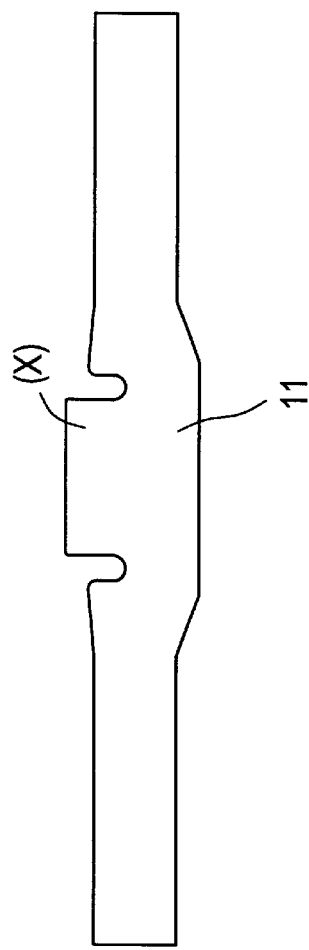

FIG. 5A illustrates an unfolded state of a metal terminal which has been used in a conventional through-type LC filter;

FIG. 5B illustrates a front view of a metal terminal which has been used in a conventional through-type LC filter;

FIG. 6A. illustrates a front view of another preferred embodiment of a metal terminal according to the present invention;

FIG. 6B illustrates a plan view of another preferred embodiment of a metal terminal according to the present invention shown in FIG. 6A; and FIG. 6C illustrates a sectional view taken along line A—A' of FIG. 6A.

DETAILED DESCRIPTION OF PREFERRED EMBODIMENTS

Preferred embodiments of a metal terminal and an electronic component according to the present invention are explained with reference to the attached drawings.

FIGS. 1A–1E show a preferred embodiment of a metal terminal according to the present invention. The metal terminal 10 is preferably formed by rolling up a conductive metal plate which is preferably made of phosphor bronze, or other suitable material. The terminal 10 includes a portion 11 having a cross section which has an approximately circular shape which is protruded in an expanded condition (See FIG. 1D.), and substantially cylindrical portions 12 (See FIG. 1E) having a smaller diameter extended in the axial direction from the approximately circular shaped portion 11. The portion 11 having the approximately circular shape has an elasticity which is contractible in the direction of diameter and the centerline $L_1$ is coincident with that of the small-diameter cylindrical portions 12.

Figure 2:
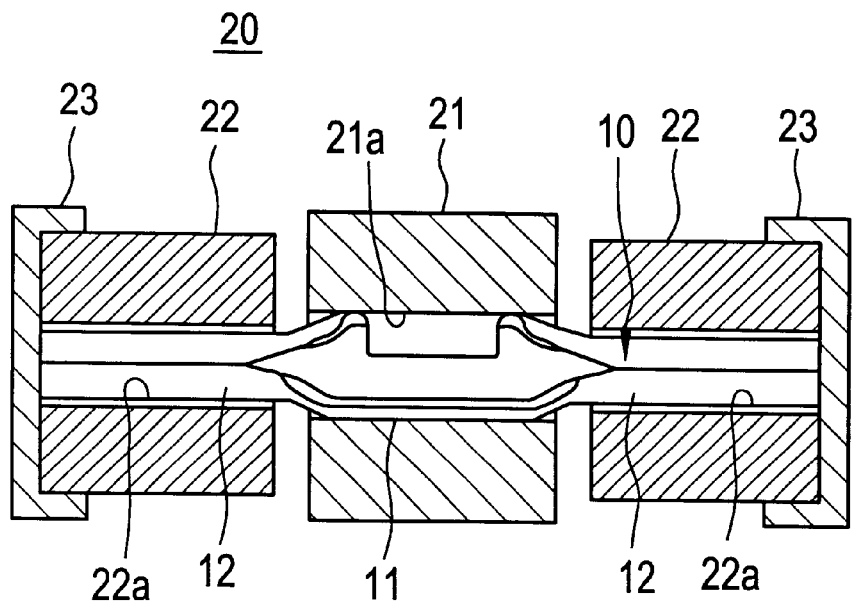
FIG. 2 is a sectional view showing a preferred embodiment of an electronic component (a through-type LC filter) of the present invention.

FIG. 2 shows a through-type LC filter 20 according to another preferred embodiment of an electronic component according to the present invention. This through-type LC filter 20 includes the above-mentioned metal terminal 10 shown in FIGS. 1A–1E, a through-type capacitor 21, ferrite beads 22 and conductive metal caps 23. Further, in FIG. 2 there is a gap shown between the through-type capacitor 21 and the ferrite beads 22, but the capacitor 21 and the beads 22 are preferably arranged so as to almost contact each other.

The through-type capacitor 21 has an external electrode disposed on its outside surface and an internal electrode disposed on the inner wall of the capacitor through-hole 21a, and by inserting the above-mentioned metal terminal 10 into the through hole 21a, the portion 11 having the approximately circular shape is arranged to elastically contact and press against the inner wall of the through hole 21a. That is, a position of the through-type capacitor 21 is accurately maintained by the approximately circular shaped portion 11 of the metal terminal 10, and the internal electrode is disposed in electrical contact with the metal electrode 10.

The ferrite beads 22 function as an inductance component and are preferably located on both sides of the through-type capacitor 21. The through holes 22a of the beads 22 are mated with the cylindrical portions 12 having a smaller diameter than that of the metal terminal 10. The metal caps 23 are mounted in a fixed condition on the end portion of the ferrite beads, and connected to both of the end portions of the metal terminal 10 via resistance welding or other suitable means to function as an input and output terminal.

The through-type LC filter 20 constructed as described above is preferably mounted by soldering the metal caps 23 and the external electrode (not shown) of the through-type capacitor 21 on the board or substrate (not shown).

Figure 4:
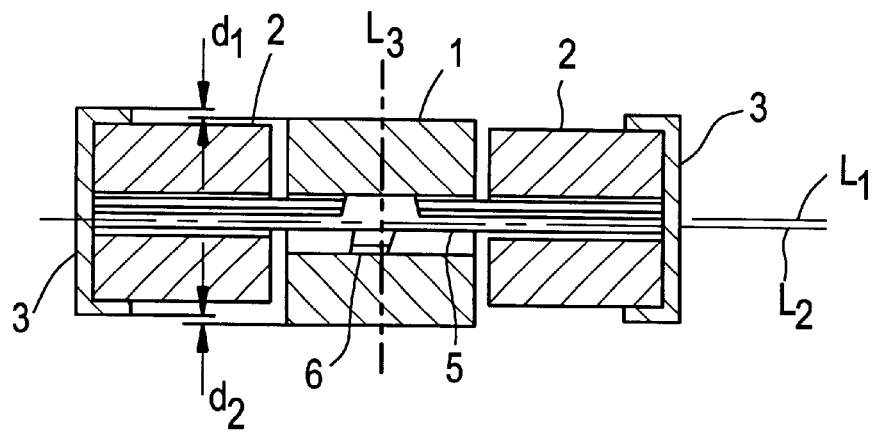

In the above-described through-type LC filter 20, the portion 11 having the approximately circular shape of the metal terminal 10 symmetrically contacts the portions of (X) and (Y) shown in FIG. 1B and FIG. 1D. As a result, the centerline $L_1$ of the metal terminal 10 is coincident with the centerline of the through-type capacitor 21 and consequently, the alignment of centerlines is maintained and there is no misalignment or tilting that occurs. Further, because the approximately circular shaped portion 11 is nearly equal in length to the through-type capacitor 21 and the force F of the approximately circular shaped portion pressing the inner wall surface of the through hole 21a (See FIG. 1B) is uniform over the entire length thereof, there is no concern that the through-type capacitor 21 could be moved to or maintained in a tilted state. Also, there is no chance that the approximately circular shaped portion 11 is deformed in its axial direction as seen in the case of the conventional tongue-like part 6. Because of the features and advantages provided by the approximately circular shaped portion and other features of the preferred embodiments of the present invention, the through-type capacitor 21 is maintained at an accurate position relative to the metal terminal 10. Therefore, regarding the outer surfaces of the through-type capacitor 21 and metal caps 23, errors such as $d_1$ and $d_2$ as shown in FIG. 4 do not occur, and accordingly, defects caused by soldering can be prevented when the through-type LC filter 21 is mounted on a board substrate.

Figure 3:
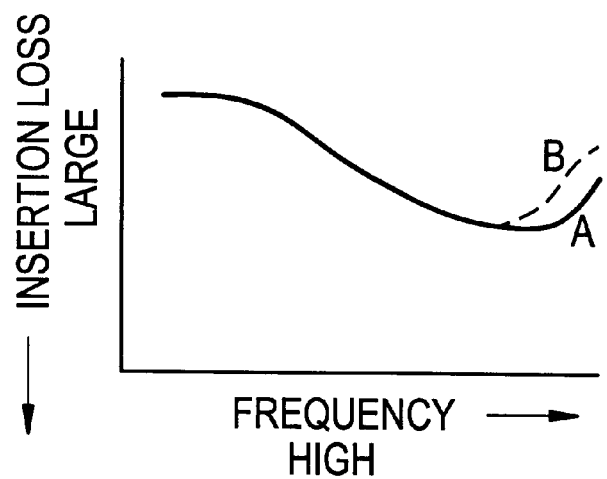
FIG. 3 is a graph showing the high-frequency characteristic of a through-type capacitor.

Also, the conventional tongue-like part 6 is likely to produce a component of inductance which often causes the high-frequency characteristic of a capacitor to be degraded as shown by a dotted line B in FIG. 3. But in the approximately circular shaped portion 11 of the metal terminal 10, a component of inductance is negligible and can be ignored and the high-frequency characteristic of the capacitance 21 is greatly improved as shown by a solid line of A in FIG. 3. As a result, the ability to eliminate high-frequency noise is greatly improved.

When desired, the thickness of the beads 22 can be greatly increased (the through hole 22a being able to be made smaller) because the outer diameter of the cylindrical portion 12 having a small diameter is made even smaller. As a result, the impedance is significantly increased to a very large value and the effect of eliminating noise is greatly improved. The metal terminal 10 can maintain the trough-type capacitor 21 in a stable condition and accurate position by the approximately circular shaped portion 11 alone, and therefore, the cylindrical portion 12 having a small diameter can be constructed to have an even smaller diameter than the conventional metal terminal 5. The angle defined by the cylindrical portion 12 having the small diameter and the portion 11 having the approximately circular shape is desired to be about 20° or larger.

Although one tongue-like portion (X) is provided in the portion 11 in the above preferred embodiment, as shown in FIG. 6, two tongue-like portions (X) may be provided in the portion 11. According to the preferred embodiment shown in FIG. 6, elasticity can be further improved. As a result of the structure shown in FIG. 6, the thermal expansion can be reduced, thereby decreasing the force applied to the capacitor.

Further, a metal terminal and an electronic component are not limited to the above-mentioned preferred embodiments but can be variously modified within the scope of the present invention.

In particular, the metal terminal can be applied not only to the through-type LC filter, but also to a single through-type capacitor without ferrite beads. Alternatively, the terminal can be applied to maintain the position of through-type electronic elements other than capacitors.

While the invention has been particularly shown and described with reference to preferred embodiments thereof, it will be understood by those skilled in the art that the forgoing and other changes in form and details may be made therein without departing from the spirit of the invention.

What is claimed is:

1. An electronic component comprising:
   a through-hole type capacitor having a through-hole, ferrite beads including a through hole and being disposed at both ends of the capacitor, and conductive caps which are attached to the ferrite beads; and
   a metal terminal comprising a substantially circular portion defining a substantially continuous circular cross section and protruding at a central portion thereof, and a substantially cylindrical portion extending from said substantially circular portion in the axial direction and having a smaller diameter than that of the substantially circular portion;
   wherein said substantially circular portion of said metal terminal is arranged such that no portion of said substantially circular portion overlaps or wraps around any other portion of said substantially circular portion and is disposed in the through hole of the capacitor so as to contact and elastically press against the inner wall of the through hole.

2. An electronic component according to claim 1, wherein the through-hole type capacitor is mated with the substantially circular shape portion of the terminal.

3. An electronic component according to claim 1, wherein the substantially cylindrical portions extend from both sides of the substantially circular shape portion of said terminal.

4. An electronic component according to claim 1, wherein the through hole of the ferrite beads is mated with the substantially cylindrical portions of the terminal.

5. An electronic component according to claim 1, wherein the substantially circular portion of the terminal is arranged to contact with and to elastically press against an inner wall of the through hole of the capacitor to maintain a position of the component.

6. An electronic component according to claim 1, wherein the conductive caps are electrically connected to the terminal.

7. An electronic component according to claim 1, wherein the metal terminal comprises a metal plate that is arranged to have a substantially cylindrical configuration.

8. An electronic component according to claim 1, wherein the metal terminal is made of phosphor bronze.

9. An electronic component according to claim 1, wherein the substantially circular shaped portion of the metal terminal has an elasticity which is contractible in a direction of a diameter thereof.

10. An electronic component according to claim 1, wherein a length in the axial direction of said substantially circular portion is substantially equal to a length of said through-hole type capacitor.

* * * * *